July 20, 1954  E. SCHMITZ  2,684,170
NONCORROSIVE WELDED TANK JOINT
Filed Dec. 11, 1950
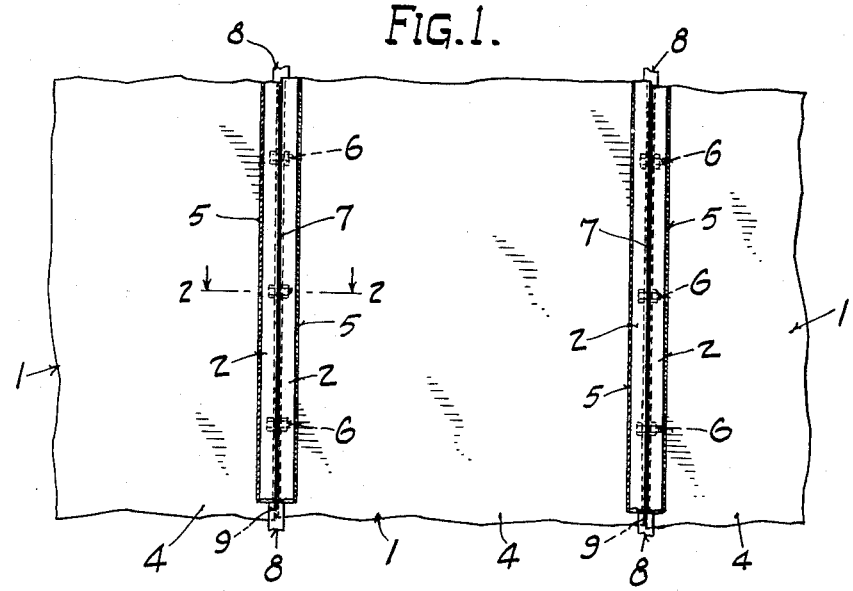
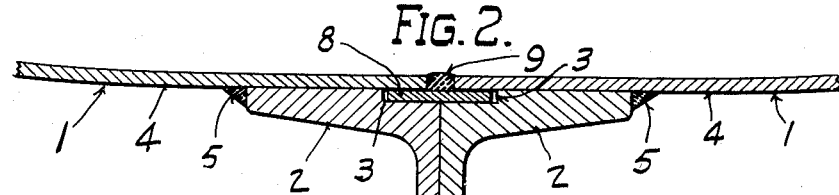
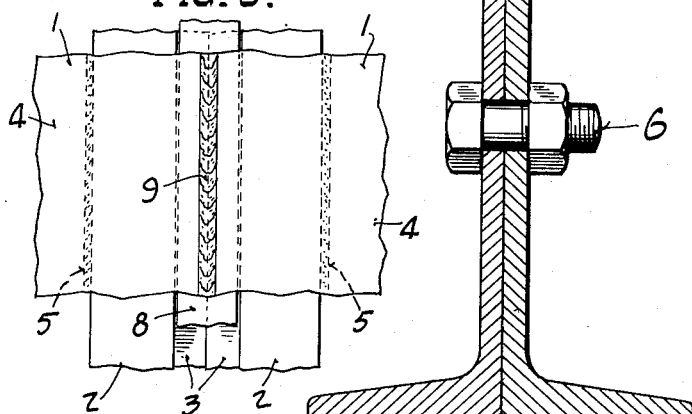
INVENTOR.
Ewald Schmitz
BY Andrus & Sceales
ATTORNEYS.

Patented July 20, 1954

2,684,170

UNITED STATES PATENT OFFICE 2,684,170

NONCORROSIVE WELDED TANK JOINT

Ewald Schmitz, Milwaukee, Wis., assignor to A. O. Smith Corporation, Milwaukee, Wis., a corporation of New York Application December 11, 1950, Serial No. 200,184

3 Claims. (Cl. 220—5)

This invention relates to storage tanks and in particular, to an improvement in the method of joining corrosion-resistant alloy plates in the construction of storage tanks.

An object of the present invention is to provide a less costly and more rapid method of assembling alloy panels in the construction of sectional storage tanks.

Another object of this invention is to provide an alloy weld between the alloy panels of a sectional storage tank without carbon steel dilution.

Another object is to provide a sectional storage tank with a smooth inner surface.

Other objects and advantages of the invention will appear during the course of the description.

Storage tanks which are to contain corrosive materials are generally constructed of, or lined with, a corrosion-resistant alloy metal. Such an alloy being more expensive than structural steel, it is usually employed as a thin sheet on the inner surfaces of the tank, with a steel reinforcing member, such as a channel or shell, attached to the alloy sheet to provide the required strength. Ordinarily, the alloy plates of a sectional storage tank are joined together by means of an alloy butt strap which overlaps the aligned edges of the adjoining plates and is welded with alloy material to the inner surface of the respective plates.

Heretofore, the adjoining edges of the plates have not been generally welded directly together because the carbon steel of the attached reinforcing member tended to diffuse into the alloy weld and render the welded area subject to corrosion.

By the present invention the adjoining edges of the alloy plates are welded directly together by providing for an alloy chill which is inserted between the vertical edges of the plates and the reinforcing member and serves as a backing for the alloy seam weld of the alloy plates, thereby preventing carbon steel dilution of the alloy weld. The preferred method of employing this invention is to chamfer a longitudinal slot or recess in the inner surface of the reinforcing member, said recess being centrally aligned of the adjoining edges of the plates, and into which recess the alloy chill is inserted. By dispensing with the butt strap method of joining the alloy plates a corresponding saving in metal and in the number of welds is brought about. In addition a smooth inner tank surface is produced.

In the drawings:

Figure 1 is a side elevation of a portion of a sectional storage tank looking at the outside wall and embodying the invention;

Fig. 2 is an enlarged section taken on line 2—2 of Fig. 1 to show the joining of two panels of the side wall; and Fig. 3 is a fragmentary inside view of the tank at a joint.

The accompanying drawing illustrates an embodiment of the invention as applied to a field erected storage tank substantially as described in U. S. Patent Number 2,395,685 for a storage tank, issued to Henry A. Schmitz, Jr., on February 26, 1946. This embodiment shows a plurality of panels 1 of a sectional storage tank, each panel having its edge reinforced by a vertical channel 2, the heel of said channel having chamfered in it a longitudinal recess 3 beneath the edge of the alloy panel plate 4. The channel 2 is attached to the alloy plate 4 by the outer weld 5. The welds 5 need not be of corrosion-resistant material as these welds do not come in contact with the contained material.

In assembling the tank in the field the channels 2 of adjoining panels 1 are disposed back-to-back, the recess 3 in one channel being aligned with the recess 3 of the adjoining channel to form one continuous recess. While maintained in this position the channels are secured together by the tie bolts 6 and the vertically disposed outer weld 7.

An alloy chill 8 is inserted into the vertical recess from the top down after the panels are joined together, or it may be inserted into the recess of one panel before assembly, the alloy plate of the adjoining panel being pried away, if necessary, from the attached channel so that the chill may be conveniently inserted into the recess of the said adjoining panel when the two panels are assembled. After assembly the alloy plate can be pounded back into position for welding the final joint. The chills are preferably thin strips of corrosion-resistant alloy of a sufficient width to overlap the joint between two adjoining plates and serve to prevent carbon steel dilution of the weld 9 joining the plates.

The weld 9 is preferably a fusion weld produced by the deposition of molten metal at the abutting edges and the fusion of the same together. For this purpose the deposited metal should be of an alloy corresponding as near as possible to the corrosion-resistant alloy of plates 4. The chill 8, being of the same alloy, is fused in the joint without effecting any dilution of the alloy of the weld.

The preferred method of employing the present invention is to mill the slot in the reinforcing member, but equal results can be attained by milling the slot in the inner aligned edges of the alloy plates provided, however, that the alloy plates are of sufficient thickness to permit the milling of said slot.

Various embodiments of the invention may be employed within the scope of the following claims.

I claim:

1. In a sectional storage structure of the class described, a plurality of thin corrosion-resistant alloy plates having their adjoining edges aligned, and said plates extending on the same plane to provide an even and unbroken surface on the inside of the structure, a channel reinforcing member for each aligned edge of the several plates, said channel having chamfered in its inner heel a longitudinal recess and being secured to the respective plates with the recessed heel of the channel partially lapping the edge of the plate, said plates being assembled by securing the adjacent edge reinforcing channels back-to-back with the recess of one channel aligned with the recess of the other channel to form one continuous recess, a non-corrosive alloy chill disposed in the recess beneath the plate edges, said chill being of sufficient width to lap the joint between the adjacent plates, and a weld of corrosion-resistant metal joining together the aligned edges of the adjacent plates.

2. In a sectional storage tank of the class described, a plurality of thin corrosion-resistant alloy plates having their adjoining edges aligned, and said plates extending on the same plane to provide an even and unbroken surface on the inner face of the wall of the tank, an outer reinforcing member for each of the several plates having a longitudinal recess chamfered in the surface thereof beneath the edge of the corresponding plate and open at the inner corner of the member, said reinforcing members being attached to the plates by welds along the outer edge of each member, said plates being assembled and the adjoining reinforcing members being welded together so that the recess in one reinforcing member is aligned with the recess of the adjoining reinforcing member to form one continuous recess beneath the adjoining alined edges of the plates, a corrosion-resistant alloy chill disposed in said continuous recess beneath the plate edges, said chill being of sufficient width to lap the joint between the adjoining plates, and a corrosion-resistant weld joining together the edges of the adjoining plates and said chill strip.

3. In a sectional storage tank, a plurality of thin corrosion-resistant alloy plates having their adjoining edges aligned, and said plates extending on the same circumferential plane to provide a smooth and unbroken surface on the inside of the tank, a channel reinforcing member for each edge of the several plates, said channel having chamfered in its inner heel a longitudinal recess and being welded to said plate at the outer extremity of the flange of said channel with the recessed heel partially overlapping and beneath the vertical edge of the plate, said plates being assembled by mechanically securing the adjacent edge reinforcing channels back-to-back and joining the channel members in such position by a weld along the outer extremities of the channels so that the recess of one channel is aligned with the recess of the adjoining channel, a non-corrosive alloy chill disposed in said recess and being of sufficient width to lap the joint between the adjacent plates, and a weld of corrosion-resistant metal joining together the vertical edges of the adjacent plates.

References Cited in the file of this patent

UNITED STATES PATENTS

| Number | Name | Date |
|---|---|---|
| 1,483,293 | Foster | Feb. 12, 1924 |
| 1,966,241 | Furrer | July 10, 1934 |
| 2,198,331 | Chyle | Apr. 23, 1940 |
| 2,344,856 | Earle | Mar. 21, 1944 |
| 2,395,685 | Schmitz | Feb. 26, 1946 |

FOREIGN PATENTS

| Number | Country | Date |
|---|---|---|
| 278,929 | Great Britain | Oct. 10, 1927 |